United States Patent

[11] 3,598,101

| [72] | Inventor | James L. Hensley |
| | | Knoxville, Tenn. |
| [21] | Appl. No. | 764,116 |
| [22] | Filed | Oct. 1, 1968 |
| [45] | Patented | Aug. 10, 1971 |
| [73] | Assignee | The Carborundum Company |
| | | Niagara Falls, N.Y. |

[54] WIRE SAW
6 Claims, 12 Drawing Figs.

| [52] | U.S. Cl. | 125/21 |
| [51] | Int. Cl. | B28d 1/08 |
| [50] | Field of Search | 51/406; 125/21, 12 |

[56] References Cited
UNITED STATES PATENTS

| 3,267,623 | 8/1966 | Block | 51/406 |
| 2,696,228 | 12/1954 | Bowen | 125/21 X |
| 2,679,839 | 6/1954 | Metzger | 125/21 |

FOREIGN PATENTS

| 1,378,362 | 10/1964 | France | 125/21 |
| 1,071,828 | 3/1954 | France | 125/21 |
| 72,179 | 10/1959 | France | 125/21 |

*Primary Examiner*—Harold D. Whitehead
*Attorney*—K. W. Brownell

ABSTRACT: A wire saw for cutting stone and other materials, having cutting elements sleeved over multiple strand wires spliced together in endless fashion. The cutting elements are provided at intervals along the length of the wire and secured thereto by a forming operation. Each of the cutting elements has a tubular core, one end portion of which is secured to the wire and the opposite end portion is enlarged internally to be spaced from the wire, and this enlarged portion carries the abrasive cutting material. A coating may be applied over the wire and over the cutting elements for protection thereof.

INVENTOR
JAMES L. HENSLEY,

BY K.W. Brownell
ATTORNEYS

INVENTOR
JAMES L. HENSLEY,

BY K.W. Brownell
ATTORNEYS

INVENTOR
JAMES L. HENSLEY,

BY
ATTORNEYS 3,598,101

WIRE SAW

OBJECTS AND DESCRIPTION

This invention relates to improvements in Wire Saws of the character used for sawing stone and other materials wherein cutting elements are mounted on an endless wire and spaced apart along the length thereof.

With such wire saws as have been used heretofore for the sawing of marble and granite and other hard stone, it has been customary to use a single strand of wire, the ends of which are welded together and the cutting elements are loose on the wire. The welded ends provide a point of failure due to the action of water and abrasives in the kerf and the strand of wire also is weakened due to the sliding and slippage of the cutting elements with respect thereto.

One object of the invention is to improve the construction of the wire saw to overcome the foregoing objections and to provide a more effective and enduring life thereto.

Another object of the invention is to provide for the effective securing of the cutting elements to the wire which will not be weakened in movement of the elements around sheaves or through the kerf and may be made of an extended run, if desired, for effective cutting over a substantial length.

These objects may be accomplished, according to certain embodiments of the invention, by using a cable having multiple strands, each strand of which is made of a multiplicity of wires so that a very large number of wires are included in the complete cable. The cutting elements are sleeved over the cable at one or both ends thereof, after which these ends are spliced together.

It is preferred that the splice will extend over a considerable length of cable and will fall within the length of several of the cutting elements to be surrounded thereby. Each of the cutting elements comprises a tubular core, one end portion having a reduced internal diameter with respect to the opposite end portion. The said one end portion is subjected to a forming operation as by rotary swagging to securely fasten said end portion to the cable. The other end portion carries an abrasive cutting element on the periphery thereof. By being of enlarged internal diameter, said second end portion allows flexibility of the cable with respect thereto as, for example, in movement of the cable around sheaves and through kerfs.

These embodiments are illustrated in the accompanying drawings, in which.

Individual cutting elements are illustrated generally at 1. The number of elements used and the spacing thereof with respect to the cable can be varied as desired, according to the length of the wire saw and the material to be cut. This wire saw is capable of use in many different types of materials. It will cut effectively marble and granite, as well as other types of stone, but the invention may also be applied and used in connection with other materials and other types of wire cutters.

Figure 4:
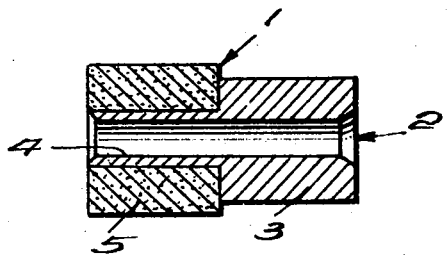
FIG. 4 is a longitudinal section through one of the cutting elements, detached before application.

One form of cutting element 1 is illustrated in FIG. 4, being the initial form of cutter before application to the cable. This cutting element 1 includes a tubular core 2, having an end portion 3 for securing the cutting material 5. The opening through the core is of appreciably larger diameter than the diameter of the cable.

Figure 5:
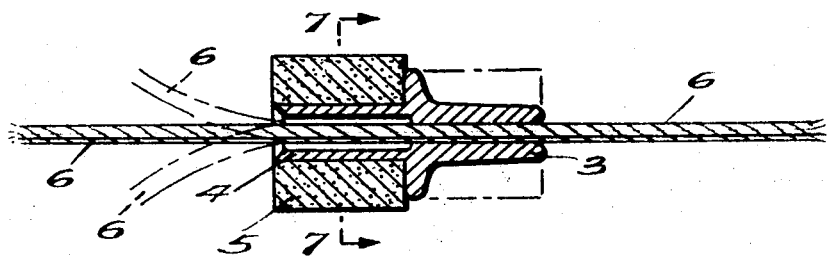
FIG. 5 is a similar view after application of the cutting element to the cable.
Figure 6:
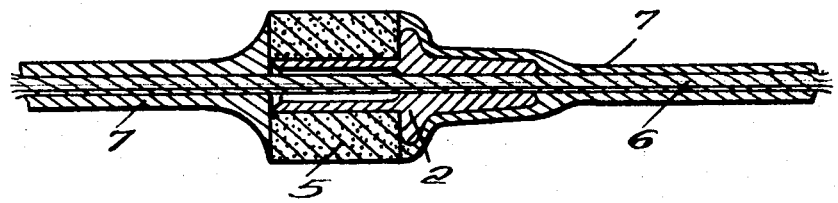
FIG. 6 is a similar view, showing a cutting element applied thereto.
Figure 7:
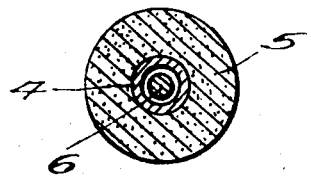
FIG. 7 is a cross section through the cutting element of the line 7-7 in FIG. 5.

In its initial stage, it will be noted that the portion 3 is appreciably thicker in its wall thickness than the portion 4 so as to allow flow of metal to a smaller internal diameter in clamping the portion 3 onto the wire or cable, which is here illustrated generally at 6, as shown in FIG. 5.

The portion 3 will be subjected to a forming operation as by rotary swedging in reducing the internal diameter of this portion to a tightly clamped relation onto the periphery of the wire, permanently connecting the same together in the manner illustrated in FIg. 5, while the internal diameter of the end portion 4 is spaced from the periphery of the wire for freedom of flexibility with respect thereto.

The cutting element 5 is formed of any suitable or desired material, such as an abrasive of the nature of silicon carbide segmental diamond cutting materials, silicate carbide, tungsten carbide, boron carbide, or other materials having configurations in grit sizes suitable for use according to the materials to be cut.

Figure 1:
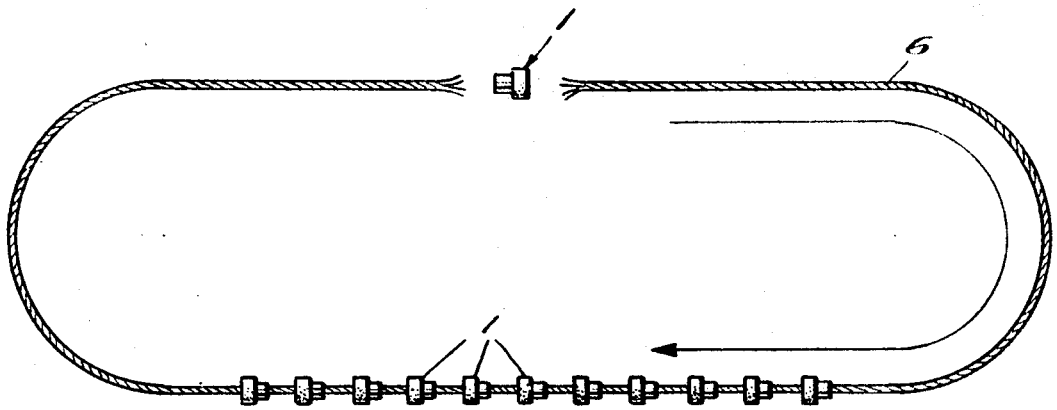
FIG. 1 is a diagrammatic view, showing a cable having the cutting elements applied thereto.
Figure 2:
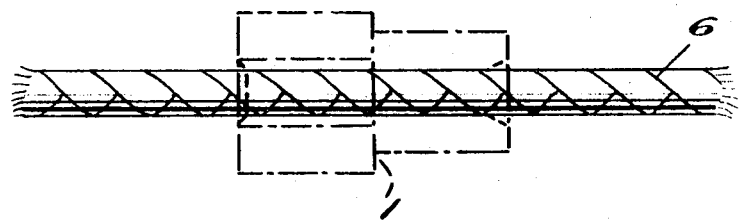
FIG. 2 is a partial diagrammatic view of the cable, illustrating the splice therein.

The cable or wire 6 is cut to the desired finished length plus the desired extra length for splicing. It is preferably made up of a plurality of strands, each of which has a multiplicity of individual wires incorporated therein. When the wire is thus cut, the required number of cutting elements 1 are sleeved thereover, as indicated generally in FIG. 1. The ends of the wire are then brought together and made into a long or endless splice, greatly contrasted for purpose of illustration, as indicated in FIG. 2. Normally, this splice would extend over a considerable length, as for example up to 10 or 15 feet, and may be secured by 30 to 60 cutting elements. These strands are interlocked and make a substantially continuous cable which is free of any defect or breakage at a single point. In any event, several of the cutting elements may be located over the joint, as illustrated in FIG. 2.

Figure 3:
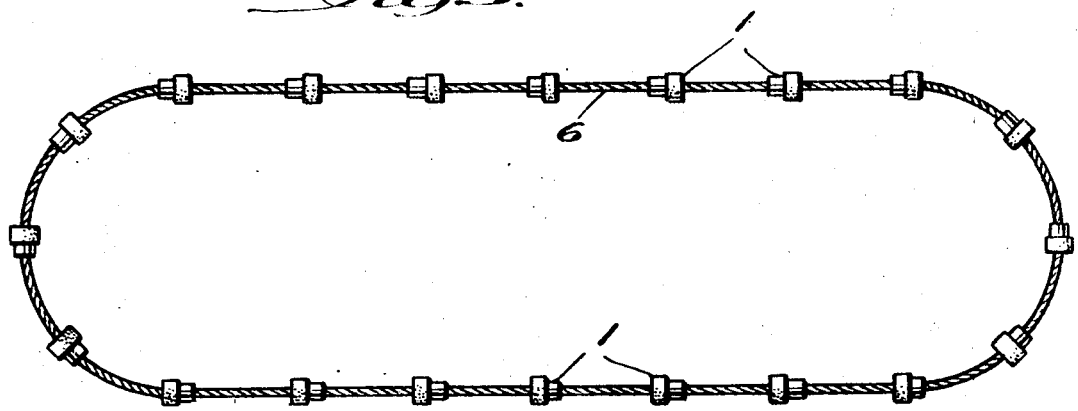
FIG. 3 is a side view of the completed wire saw.

The cutting elements are spaced at desired intervals along the length of the cable 6 after the ends thereof are spliced, as described, and formed into an endless cable, as shown in FIG. 3. Then the end portions 3 of the cutting elements 1 are subjected to a rotary swedging action or forming operation of suitable character so as to be deformed into gripping engagement with the cable. This will reduce the internal diameter of the portion 3 of each of the cutting elements to less than the internal diameter of the portion 4 thereof for securely anchoring the cutting element thereon in permanent relation while leaving the portion 4 enlarged with respect to the diameter of the cable 6 so that the cable is free to flex, as illustrated in dotted lines in FIG. 5, as for example, when the wire saw is moving about a sheave or through a curve or the like.

If desired, a protective coating, generally indicated at 7, may be applied over the cable 6 and over the swaged end portion 3 of the core 2 of the cutting element to protect the wire from the slurry produced in the cut. It is preferred to use as the protective coating polyurethane, which is sold under the trade name "Isothane". Other coating materials that may be used include Teflon poly-vinyl chloride and similar materials.

There are many advantages in this method of fastening the cutting elements on the cable. The terminals or end portions of the tubular core that are fastened by rotary swedging are permanently cold fused on the preformed wire or cable. The mechanical hammering action of the rotary swedger flows the terminal around and between the wire strands, forming an attachment as strong as the wire itself or as strong as needed for a permanent, secure connection. No heat is required, whereby there is no danger of annealing the cable.

The tensile strength of both the terminal and the cable are raised by cold swedging, thus producing an extra strong bond between the core and the cable. Bonding by swedging is consistent and allows maximum holding strength up to 100 percent of the cable strength. Rotary swedging of the character here employed consists of the reduction in diameter of the symmetrical cross-sectional tube of the ductile metal to a round section of predetermined diameter.

The cutting element, after sweding, is securely fastened to the cable wire only in the length of swedging. The inside diameter of the tubular core under the abrasive portion is not decreased form the original before swedging. This leaves the wire with maximum flexibility to carry the segment around its drive sheaves.

Figure 8:
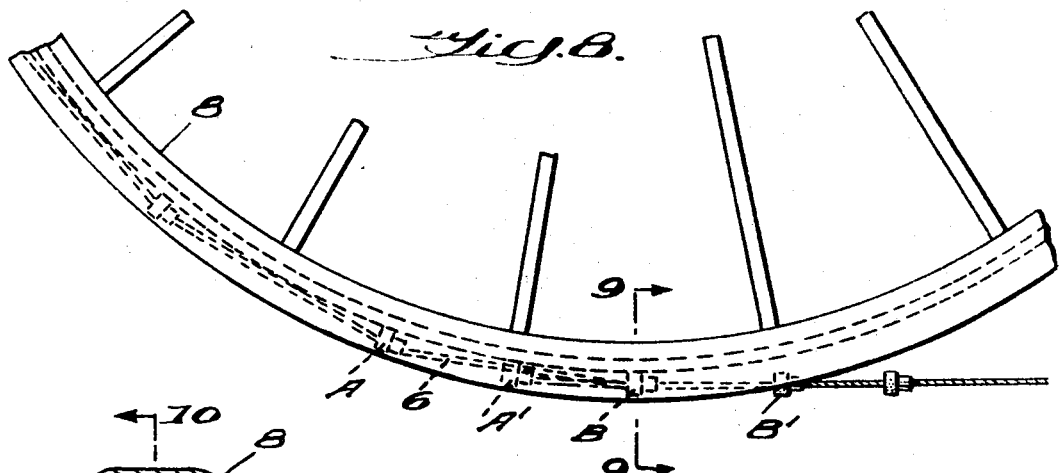
FIG. 8 is a sectional view through the circumference of a pulley, showing the wire so applied thereto.
Figure 9:
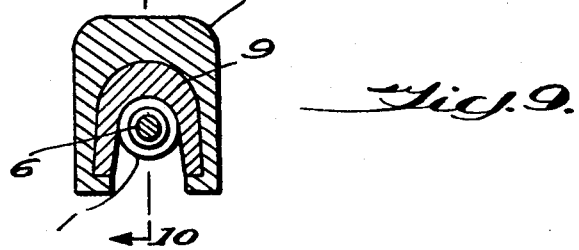
FIG. 9 is a cross section therethrough on the line 9-9 in FIG. 8.
Figure 10:
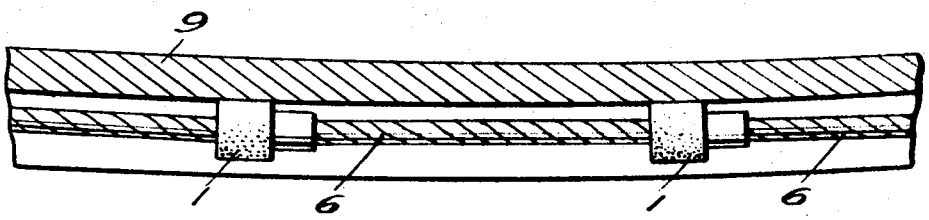
FIG. 10 is a lengthwise section through the liner of the pulley on the line 10-10 in FIG. 9.

The application of the wire saw to a sheave is illustrated diagrammatically in FIGS. 8 to 10, it being understood that the wire saw extends as an endless band around a pair of sheaves and that one end portion is shown as supported by a sheave 8 within a liner 9 therein, the latter forming a groove for receiving the wire saw and guiding it around the periphery of the sheave.

The cutting elements 1 will be guided in the groove formed by the liner 9, in the bottom of the groove, with the cable stretched in bridging relation between an adjacent pair of cutting elements.

The cutting elements 1 are shown as spaced apart in FIG. 8, with the cable 6 stretched in a straight line therebetween. The cutting elements being larger than the wire will create two running radii. For example, when the cutting element A reaches the position A' and the cutting element B reaches the position B', there is shift of the wire due to the fact that it takes a straight position horizontally from the center of the last cutting element in contact with the sheave.

When the cutting element B moves off the sheave and the cutting element A reaches the position A', the smaller cutting radius of the wire causes the offgoing element B to jump up or follow the smaller radius. Then, when the cutting element A moves around to the position initially occupied by cutting element B, the wire again jumps down to follow the large radius.

This induced whip creates a pulse in the wire which is undesirable and tends to cause the wire to wear out or have a shortened life. It is important that the wire itself will never make contact with the wheel liner 9 at the midpoint between the cutting elements, regardless of the particular wheel diameter.

The wire can be held spaced from the inner diameter of the wheel by putting the cutting elements close together so as to reduce the whip in the wire or the radius change as the wire passes around and off the wheel. As an example of this spacing I have illustrated in FIG. 10 the spacing of cutting elements 3 inches apart on the wire, but this spacing should be such, as noted above, the whip of the wire will never allow the wire to contact the base of the groove in the liner 9. Again as an example, I have found that a cord dimension should be at least three- thirty seconds inch between the base of the groove and the wire in a wheel having a diameter of 5 feet and 2 inches.

The cutting elements normally employed are very expensive especially when diamond or silicon carbide materials are used thereon. If these expensive materials are employed and are placed close enough to solve the problem, the cutting elements may far outlast the life of the wire itself and yet when the wire breaks the cutting elements are usually lost.

Figure 11:
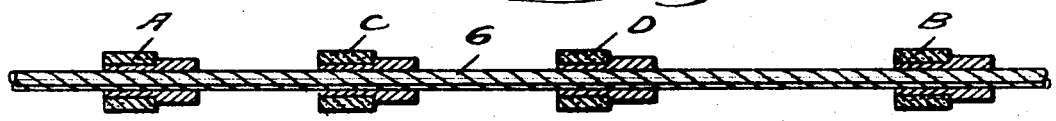
FIG. 11 is a side elevation of a section of the wire saw, showing the cutting elements spaced therealong.

I have found that it is satisfactory to use cutting elements A and B on the wire 6, spaced apart a standard distance and made of the usual diamond, carborundum or other fine materials. Then I employ additional cutting elements, indicted at C and D, spaced apart on the wire 6 from each other and from the elements A and B in the relation described above with respect to FIG. 10, as illustrated in FIG. 11. These cutting elements C and D may be of less expensive material that may wear down rapidly, but no faster than the elements A and B. They are used to obtain the proper spacing along the wire of the cable with respect to the groove in the sheave. However, in some application all of the cutting elements may be of inexpensive abrasive materials or all may be of expensive diamond or other materials, as found desirable.

Figure 12:
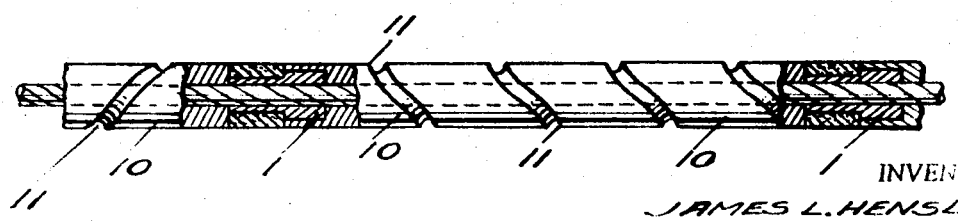
FIG. 12 is a longitudinal section of a portion of the wire saw, showing a modification.

Still another modification is shown in FIG. 12 wherein the wire 6 is shown as having a pair of cutting elements 1 spaced apart thereon in the manner described above. Intermediate the spaced cutting elements 1 are molded sections of flexible plastic material 10, which sections are preferably of the same diameter as the diameter of the cutting elements 1. This will provide one continuous diameter for the cable and will cause the cable to operate uniformly through the grooves of the sheaves. The plastic material for the fillers 10 may be of the character described above, such as polyurethane which is sold under the trade name "Isothane", or such other coating materials as found desirable, as described herein.

The peripheral portions of the fillers 10 are provided with spiral grooves 11 therein between the spaced cutting elements 1. Alternate fillers are provided with either right-hand or left-hand spiral grooves, one of which will direct cooling water into the kerf and the other will carry out slurry from the kerf. These grooves are not deep enough to expose the wire, but should be relatively shallow with respect to the thickness of the filler.

While the invention has been illustrated and described in certain embodiments, it is recognized that other variations and changes may be made therein without departing from the invention set forth in the claims.

I claim:

1. A saw comprising an endless multiple-strand flexible cable, and a plurality of cutting elements sleeved over the cable at intervals along the length thereof, each of said cutting elements including an elongated tubular core having an end portion surrounding a portion of the cable, said end portion being fused around and between the strands, said tubular core having the opposite end portion surrounding a portion of the cable and spaced from the periphery of the cable to permit freedom of flexibility of the cable with respect thereto, and an abrasive cutting element mounted on the last-mentioned end portion of the tubular core and spaced lengthwise thereof from the first-mentioned end portion.

2. A saw according to claim 1, including a polyurethane coating over the cutting elements and the cable for protection thereof.

3. A sawing device comprising sheaves spaced apart and having guiding grooves therein, a wire saw extending in bridging relation between the sheaves in the grooves thereof, said wire saw including a cable having cutting elements sleeved thereon in spaced relation in position for guided relation with the grooves, each cutting element comprising a tubular core supporting an abrasive cutting device on one end portion and having the opposite end portion swaged to the cable, and means surrounding the cable intermediate the spaced cutting elements for holding the cable spaced from the bottom of the groove during movement of the cable away from the sheave.

4. A sawing device according to claim 3 including a plurality of cutting elements intermediate the first-mentioned cutting elements and disposed in close relation to hold the cable spaced from the bottom of the groove during passage of the wire saw therearound.

5. A sawing device according to claim 3 including a coating of flexible nonmetallic material covering the cable between the cutting elements and forming the means holding the cable spaced from the bottom of the grooves.

6. A sawing device comprising sheaves spaced apart and having guiding grooves therein, a wire saw extending in bridging relation between the sheaves in the grooves thereof, said wire saw including a cable having cutting elements sleeved thereon in spaced relation in position for guided relation with the grooves, and a coating of flexible nonmetallic material covering the cable between the cutting elements for holding the cable space from the bottom of the grooves, said coating having peripheral spiral grooves for directing fluid with respect to the cable.